US012607868B2

(12) United States Patent
Granger et al.

(10) Patent No.: US 12,607,868 B2
(45) Date of Patent: Apr. 21, 2026

(54) CATADIOPTRIC LENS MODULE

(71) Applicant: Apple Inc., Cupertino, CA (US)

(72) Inventors: Zachary A Granger, Redwood City, CA (US); Fuyi Yang, San Jose, CA (US); Graham B Myhre, Campbell, CA (US); Young Cheol Yang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 381 days.

(21) Appl. No.: 18/329,281

(22) Filed: Jun. 5, 2023

(65) Prior Publication Data

US 2024/0077740 A1 Mar. 7, 2024

Related U.S. Application Data

(60) Provisional application No. 63/404,493, filed on Sep. 7, 2022.

(51) Int. Cl.
| | |
|---|---|
| *G02B 27/09* | (2006.01) |
| *G02B 1/11* | (2015.01) |
| *G02B 5/30* | (2006.01) |
| *G02B 27/01* | (2006.01) |
| *G02B 27/14* | (2006.01) |

(52) U.S. Cl.
CPC ............ *G02B 27/0955* (2013.01); *G02B 1/11* (2013.01); *G02B 5/3083* (2013.01); *G02B 27/0172* (2013.01); *G02B 27/142* (2013.01); *G02B 2027/014* (2013.01)

(58) Field of Classification Search
CPC .... G02B 27/0955; G02B 1/11; G02B 5/3083; G02B 27/0172; G02B 27/142; G02B 2027/014; G02B 27/286
See application file for complete search history.

(56) References Cited

U.S. PATENT DOCUMENTS

| | | | | |
|---|---|---|---|---|
| 5,120,136 A | * | 6/1992 | Oakley | .................. G11B 7/003 |
| | | | | 359/305 |
| 7,542,209 B2 | | 6/2009 | McGuire, Jr. | |
| 7,738,172 B2 | | 6/2010 | McGuire, Jr. | |
| 7,859,977 B2 | | 12/2010 | Tan et al. | |
| 8,947,760 B2 | | 2/2015 | McCarthy | |

(Continued)

FOREIGN PATENT DOCUMENTS

| | | |
|---|---|---|
| CN | 112596238 A | 4/2021 |
| WO | 2018026633 A1 | 2/2018 |

*Primary Examiner* — Mariam Qureshi

(74) *Attorney, Agent, or Firm* — Treyz Law Group, P.C.; Joseph F. Guihan; Jinie M. Guihan

(57) ABSTRACT

An electronic device may include a display system and an optical system that are supported by a housing. The optical system may be a catadioptric optical system having first, second, and third lens elements. The first lens element may have a convex surface and a concave surface. The convex surface may have less curvature than the concave surface. An anti-reflective coating may be formed on the convex surface. A partially reflective mirror may be interposed between the first and second lens elements and a reflective polarizer may be interposed between the second and third lens elements. Alternatively, a partially reflective mirror may be interposed between the second and third lens elements and a reflective polarizer may be interposed between the first and second lens elements.

18 Claims, 4 Drawing Sheets

(56)             References Cited

U.S. PATENT DOCUMENTS

|  |  |  |  |
|---|---|---|---|
| 9,323,059 B2 | 4/2016 | Wang et al. | |
| 10,119,816 B2 | 11/2018 | Slotwinski et al. | |
| 10,126,552 B2 | 11/2018 | Brown et al. | |
| 10,139,627 B2 | 11/2018 | Benoit et al. | |
| 10,663,745 B2 | 5/2020 | Ouderkirk et al. | |
| 2016/0041396 A1 | 2/2016 | Kawamura et al. | |
| 2017/0068029 A1 | 3/2017 | Yun et al. | |
| 2018/0039052 A1 | 2/2018 | Khan et al. | |
| 2018/0231786 A1 | 8/2018 | Ouderkirk et al. | |
| 2019/0086675 A1 | 3/2019 | Carollo et al. | |
| 2019/0146198 A1* | 5/2019 | Khan | G02B 17/0856 345/8 |
| 2020/0081253 A1* | 3/2020 | Montevirgen | G02B 27/0172 |
| 2020/0356053 A1 | 11/2020 | Seo et al. | |
| 2021/0294105 A1 | 9/2021 | He et al. | |

* cited by examiner

CATADIOPTRIC LENS MODULE

This application claims priority to U.S. provisional patent application No. 63/404,493, filed Sep. 7, 2022, which is hereby incorporated by reference herein in its entirety.

BACKGROUND

This relates generally to optical systems and, more particularly, to optical systems for head-mounted displays.

Head-mounted displays such as virtual reality glasses use lenses to display images for a user. A microdisplay may create images for each of a user's eyes. A lens may be placed between each of the user's eyes and a portion of the microdisplay so that the user may view virtual reality content.

If care is not taken, a head-mounted display may be cumbersome and tiring to wear. Optical systems for head-mounted displays may use arrangements of lenses that are bulky and heavy. Extended use of a head-mounted display with this type of optical system may be uncomfortable.

It would therefore be desirable to be able to provide improved head-mounted displays.

SUMMARY

An electronic device may include a display panel configured to produce light and a lens assembly that receives the light. The lens assembly may include a first lens element, a second lens element, a third lens element, wherein the second lens element is interposed between the first and third lens elements, a partially reflective mirror that is interposed between the first and second lens elements, a quarter wave plate that is interposed between the second and third lens elements, and a reflective polarizer that is interposed between the second and third lens elements. The first lens element may have a convex surface and a concave surface, the convex surface may be interposed between the display panel and the concave surface, the convex surface may have less curvature than the concave surface, and the reflective polarizer may be interposed between the third lens element and the quarter wave plate.

An electronic device may include a display panel configured to produce light and a lens assembly that receives the light. The lens assembly may include a first lens element, a second lens element, wherein the first lens element is interposed between the second lens element and the display panel, a third lens element, wherein the second lens element is interposed between the first and third lens elements, a partially reflective mirror that is interposed between the second and third lens elements, and a reflective polarizer that is interposed between the first and second lens elements.

An electronic device may include a display panel configured to produce light and a lens assembly that receives the light. The lens assembly may include a first lens element, wherein the first lens element has a first convex surface and a first concave surface, wherein the first convex surface is interposed between the display panel and the first concave surface, and wherein the first convex surface has less curvature than the first concave surface, a second lens element, wherein the second lens element has a second convex surface and a second concave surface, wherein the second convex surface is interposed between the display panel and the second concave surface, wherein the second convex surface has more curvature than the second concave surface, and wherein the first lens element is interposed between the second lens element and the display panel, a third lens element, wherein the third lens element has a third convex surface and a third concave surface, wherein the third convex surface is interposed between the display panel and the third concave surface, and wherein the second lens element is interposed between the first and third lens elements, a first anti-reflective coating on the first convex surface, a second anti-reflective coating on the third concave surface, a partially reflective mirror that is interposed between the first and second lens elements, a quarter wave plate that is interposed between the second and third lens elements, and a reflective polarizer that is interposed between the second and third lens elements, wherein the reflective polarizer is interposed between the third lens element and the quarter wave plate.

DETAILED DESCRIPTION

Head-mounted displays may be used for virtual reality and augmented reality systems. For example, a pair of virtual reality glasses that is worn on the head of a user may be used to provide a user with virtual reality content and/or augmented reality content.

Figure 1:
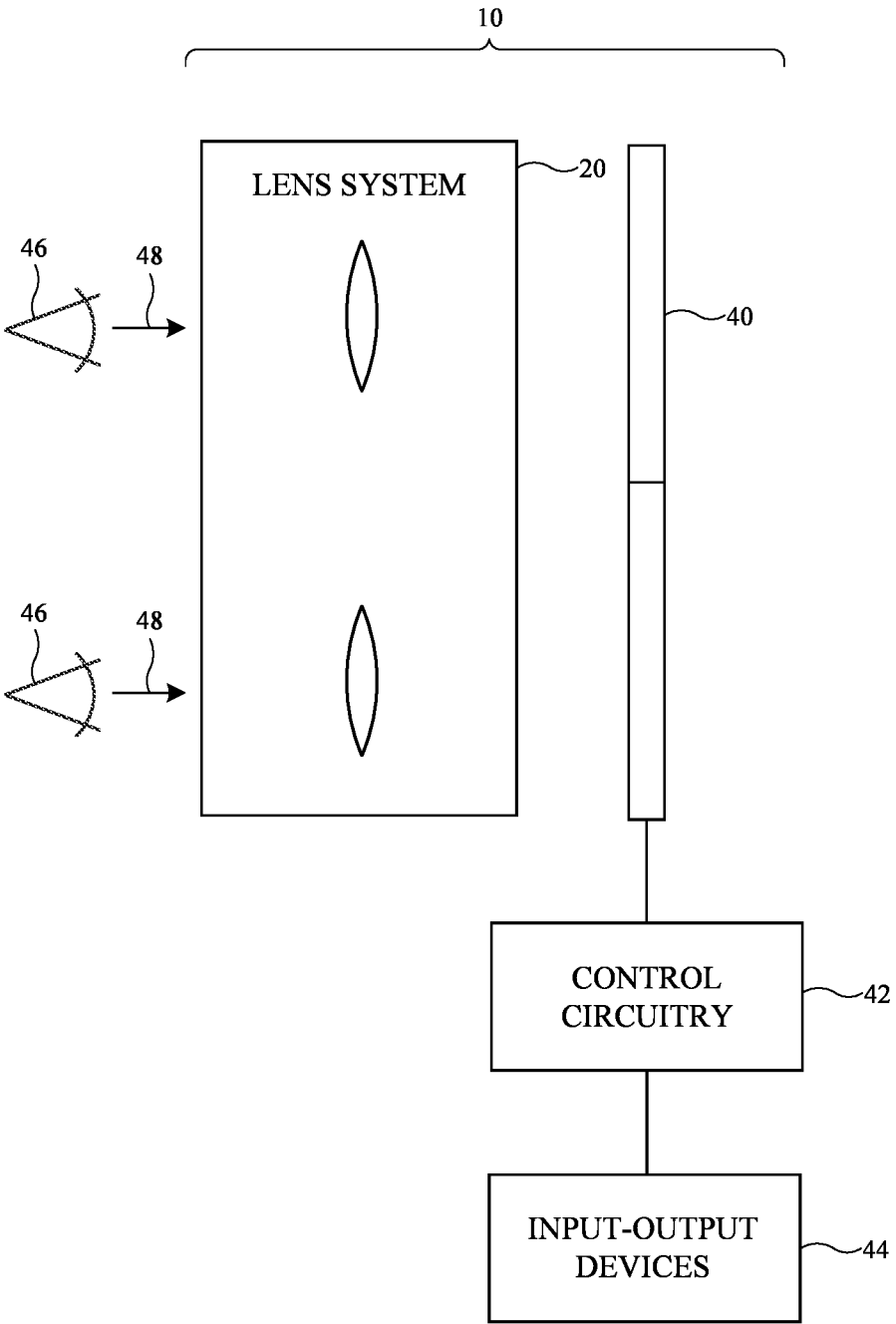
FIG. 1 is a diagram of an illustrative electronic device in accordance with some embodiments.

An illustrative system in which an electronic device (e.g., a head-mounted display such as a pair of virtual reality glasses) is used in providing a user with virtual reality content is shown in FIG. 1. As shown in FIG. 1, virtual reality glasses 10 (sometimes referred to as glasses 10, electronic device 10, head-mounted display 10, device 10, etc.) may include a display system such as display system 40 that creates images and may have an optical system such as optical system 20 through which a user (see, e.g., user's eyes 46) may view the images produced by display system 40 by looking in direction 48.

Display system 40 (sometimes referred to as display panel 40 or display 40) may be based on a liquid crystal display, an organic light-emitting diode display, an emissive display having an array of crystalline semiconductor light-emitting diode dies, and/or displays based on other display technologies. Separate left and right displays may be included in system 40 for the user's left and right eyes or a single display may span both eyes.

Visual content (e.g., image data for still and/or moving images) may be provided to display system (display) 40 using control circuitry 42 that is mounted in device 10 and/or control circuitry that is mounted outside of device 10 (e.g., in an associated portable electronic device, laptop computer, or other computing equipment). Control circuitry 42 may include storage such as hard-disk storage, volatile and non-volatile memory, electrically programmable storage for forming a solid-state drive, and other memory. Control circuitry 42 may also include one or more microprocessors, microcontrollers, digital signal processors, graphics processors, baseband processors, application-specific integrated circuits, and other processing circuitry. Communications circuits in circuitry 42 may be used to transmit and receive data (e.g., wirelessly and/or over wired paths). Control circuitry 42 may use display system 40 to display visual content such as virtual reality content (e.g., computer-generated content associated with a virtual world), pre-recorded video for a movie or other media, or other images. Illustrative configurations in which control circuitry 42 provides a user with virtual reality content using display system 40 may sometimes be described herein as an example. In general, however, any suitable content may be presented to a user by control circuitry 42 using display system 40 and optical system 20 of glasses 10.

Input-output devices 44 may be coupled to control circuitry 42. Input-output devices 44 may be used to gather user input from a user, may be used to make measurements on the environment surrounding glasses 10, may be used to provide output to a user, and/or may be used to supply output to external electronic equipment. Input-output devices 44 may include buttons, joysticks, keypads, keyboard keys, touch sensors, track pads, displays, touch screen displays, microphones, speakers, light-emitting diodes for providing a user with visual output, sensors (e.g., a force sensors, temperature sensors, magnetic sensor, accelerometers, gyroscopes, and/or other sensors for measuring orientation, position, and/or movement of glasses 10, proximity sensors, capacitive touch sensors, strain gauges, gas sensors, pressure sensors, ambient light sensors, and/or other sensors). If desired, input-output devices 44 may include one or more cameras/optical sensors (e.g., cameras for capturing images of the user's surroundings, cameras for performing gaze detection operations by viewing eyes 46, and/or other cameras).

Figure 2:
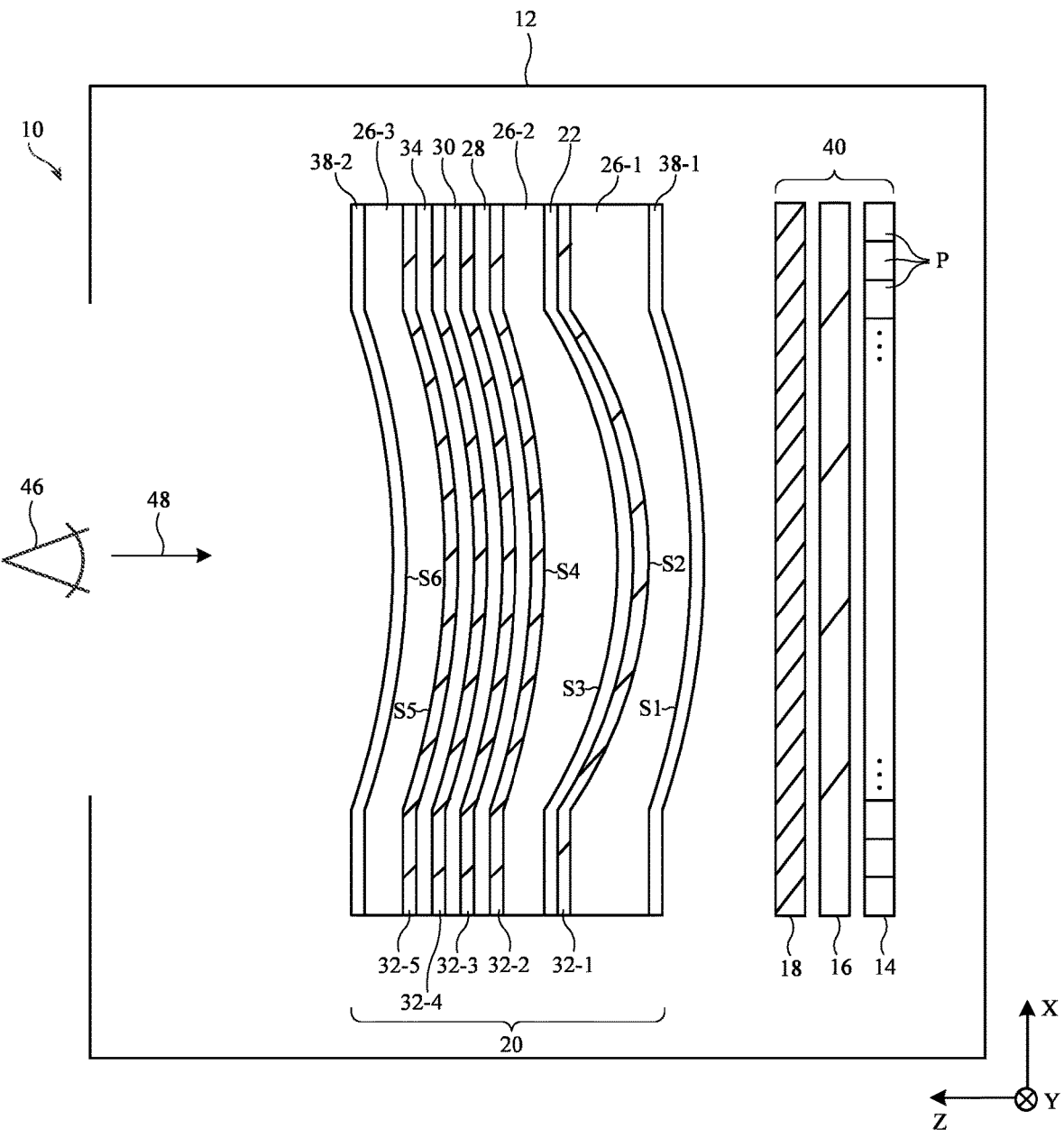
FIG. 2 is a cross-sectional side view of an illustrative electronic device with a lens assembly that includes three lens elements and a partially reflective mirror between the first and second lens elements in accordance with some embodiments.

FIG. 2 is a cross-sectional side view of device 10 showing how optical system 20 and display system 40 may be supported by head-mounted support structures such as housing 12 for device 10. Housing 12 may have the shape of a frame for a pair of glasses (e.g., glasses 10 may resemble eyeglasses), may have the shape of a helmet (e.g., glasses 10 may form a helmet-mounted display), may have the shape of a pair of goggles, or may have any other suitable housing shape that allows housing 12 to be worn on the head of a user. Configurations in which housing 12 supports optical system 20 and display system 40 in front of a user's eyes (e.g., eyes 46) as the user is viewing system 20 and display system 40 in direction 48 may sometimes be described herein as an example. If desired, housing 12 may have other desired configurations.

Housing 12 may be formed from plastic, metal, fiber-composite materials such as carbon-fiber materials, wood and other natural materials, glass, other materials, and/or combinations of two or more of these materials.

Input-output devices 44 and control circuitry 42 may be mounted in housing 12 with optical system 20 and display system 40 and/or portions of input-output devices 44 and control circuitry 42 may be coupled to device 10 using a cable, wireless connection, or other signal paths.

Display system 40 and the optical components of glasses 10 may be configured to display images for user 46 using a lightweight and compact arrangement. Optical system 20 may, for example, be based on catadioptric lenses (e.g., lenses that use both reflecting and refracting of light).

Display system 40 may include a source of images such as pixel array 14. Pixel array 14 may include a two-dimensional array of pixels P that emits image light (e.g., organic light-emitting diode pixels, light-emitting diode pixels formed from semiconductor dies, liquid crystal display pixels with a backlight, liquid-crystal-on-silicon pixels with a frontlight, etc.). A polarizer such as linear polarizer 16 may be placed in front of pixel array 14 and/or may be laminated to pixel array 14 to provide polarized image light. Linear polarizer 16 may have a pass axis aligned with the X-axis of FIG. 2 (as an example). Display system 40 may also include a wave plate such as quarter wave plate 18 to provide circularly polarized image light. The fast axis of quarter wave plate 18 may be aligned at 45 degrees relative to the pass axis of linear polarizer 16. Quarter wave plate 18 may be mounted in front of polarizer 16 (between polarizer 16 and optical system 20). If desired, quarter wave plate 18 may be attached to polarizer 16 (and display 14).

Optical system 20 may include lens elements (sometimes referred to simply as lenses) such as lens elements 26-1, 26-2, and 26-3. Each lens element may be formed from a transparent material such as plastic or glass. The lens elements may sometimes be formed using molding (e.g., molded plastic or molded glass). Lens element 26-1 may have a surface S1 that faces display system 40 and a surface S2 that faces the user (e.g. eyes 46). Lens element 26-2 may have a surface S3 that faces display system 40 and a surface S4 that faces the user (e.g. eyes 46). Lens element 26-3 may have a surface S5 that faces display system 40 and a surface S6 that faces the user (e.g. eyes 46).

A spherically curved surface (e.g., a spherically convex or spherically concave surface) may have a constant radius of curvature across the surface. In contrast, an aspherically curved surface (e.g., an aspheric concave surface or an aspheric convex surface) may have a varying radius of curvature across the surface. A cylindrical surface may only be curved about one axis instead of about multiple axes as with the spherical surface. Herein, a freeform surface that is primarily convex may sometimes still be referred to as a convex surface and a freeform surface that is primarily concave may sometimes still be referred to as a concave surface.

Each one of surface S1, S2, S3, S4, S5, and S6 may be a convex surface (e.g., a spherically convex surface, a cylindrically convex surface, or an aspherically convex surface), a concave surface (e.g., a spherically concave surface, a cylindrically concave surface, or an aspherically concave surface), or a freeform surface that includes both convex and concave portions. In one illustrative arrangement, shown in FIG. 2, surface S1 is an aspheric convex surface, surface S2 is an aspheric concave surface, surface S3 is an aspheric convex surface, surface S4 is an aspheric concave surface, surface S5 is an aspheric convex surface, and surface S6 is an aspheric concave surface. This arrangement may be described as an example herein.

Optical structures such as partially reflective coatings, wave plates, reflective polarizers, linear polarizers, antireflection coatings, and/or other optical components may be incorporated into device 10 (e.g., system 20, etc.). These optical structures may allow light rays from display system 40 to pass through and/or reflect from surfaces in optical system 20, thereby providing optical system 20 with a desired lens power.

As shown in FIG. 2, a first coating 38-1 may be formed on the aspheric convex surface S1 of lens element 26-1. Coating 38-1 may be an anti-reflective coating (ARC), anti-smudge (AS) coating, or any other desired coating.

A partially reflective mirror (e.g., a metal mirror coating or other mirror coating such as a dielectric multilayer coating with a 50% transmission and a 50% reflection) such as partially reflective mirror 22 may be formed on the aspheric convex surface S3 of lens element 26-2. Partially reflective mirror 22 may sometimes be referred to as beam splitter 22, half mirror 22, or partially reflective layer 22.

A wave plate such as wave plate 28 may be attached to the aspheric concave surface S4 of lens element 26-2. Wave plate 28 (sometimes referred to as retarder 28, quarter wave plate 28, etc.) may be a quarter wave plate that conforms to surface S4 of lens element 26-2. In some embodiments, retarder 28 may be a coating on surface S4 of lens element 26-2.

Retarder 28 in FIG. 2 may have aspheric curvature (e.g., curvature along multiple axes and with different radii of curvature) with a relatively uniform thickness to provide a relatively uniform retardation. Retardation is equal to the thickness of the retarder multiplied by the birefringence of the retarder material. The thickness of retarder 28 may be relatively uniform across the optical system (lens assembly). As specific examples, the retardation provided by retarder 28 across the entire retarder may be uniform within 20%, within 10%, within 5%, within 3%, within 2%, within 1%, etc. Similarly, the thickness of retarder 28 across the entire retarder may be uniform within 20%, within 10%, within 5%, within 3%, within 2%, within 1%, etc. In other words, the retardation variation across the retarder is no more than 20%, no more than 10%, no more than 5%, no more than 3%, no more than 2%, no more than 1%, etc. The thickness variation across the retarder is no more than 20%, no more than 10%, no more than 5%, no more than 3%, no more than 2%, no more than 1%, etc.

Reflective polarizer 30 may be attached to retarder 28. Reflective polarizer 30 may have orthogonal reflection and pass axes. Light that is polarized parallel to the reflection axis of reflective polarizer 30 will be reflected by reflective polarizer 30. Light that is polarized perpendicular to the reflection axis and therefore parallel to the pass axis of reflective polarizer 30 will pass through reflective polarizer 30.

Polarizer 34 may be attached to reflective polarizer 30. Polarizer 34 may be a linear polarizer. Polarizer 34 may be referred to as an external blocking linear polarizer 34 or cleanup polarizer 34. Linear polarizer 34 may have a pass axis aligned with the pass axis of reflective polarizer 30. Linear polarizer 34 may have a pass axis that is orthogonal to the pass axis of linear polarizer 16.

The thickness of linear polarizer 34 across the entire polarizer may be uniform within 20%, within 10%, within 5%, within 3%, within 2%, within 1%, etc. The thickness variation across the linear polarizer may be no more than 20%, no more than 10%, no more than 5%, no more than 3%, no more than 2%, no more than 1%, etc.

A second coating 38-2 may be formed on the aspheric concave surface S6 of lens element 26-3. Coating 38-2 may be an anti-reflective coating (ARC), anti-smudge (AS) coating, or any other desired coating.

As shown in FIG. 2, one or more layers of adhesive may be included in optical system 20 to attach adjacent components within the optical system. In the example of FIG. 2, five layers of adhesive (e.g., adhesive layer 32-1, adhesive layer 32-2, adhesive layer 32-3, adhesive layer 32-4, and adhesive layer 32-5) are included. Each adhesive layer may be an optically clear adhesive (OCA) layer with a transparency of greater than 80%, greater than 90%, greater than 95%, greater than 99%, etc.

Adhesive layer 32-1 is interposed between partially reflective layer 22 and lens element 26-1. Adhesive layer 32-2 is interposed between retarder 28 and lens element 26-2. Adhesive layer 32-3 is interposed between reflective polarizer 30 and retarder 28. Adhesive layer 32-4 is interposed between linear polarizer 34 and reflective polarizer 30. Adhesive layer 32-5 is interposed between lens element 26-3 and linear polarizer 34.

The optical system 20 may be formed as a single, solid lens assembly without any intervening air gaps. As shown in FIG. 2, each layer in optical system 20 is attached directly to the adjacent layers. The example of attaching adjacent components in optical system 20 using adhesive layers is merely illustrative. In general, layers in optical system 20 may instead be formed as coatings directly on an adjacent layer (and thus the intervening adhesive layer may be omitted). As a specific example, quarter wave plate 28 may be formed as a coating on lens element 26-2 and adhesive layer 32-2 may be omitted if desired. Reflective polarizer 30 and linear polarizer 34 may also be formed as coatings if desired.

During operation of device 10, light from display system 40 may pass through optical system 20 to be viewed by viewer 46. This light may exit display system 40 in the positive Z-direction (e.g., with a circular polarization), pass through partially reflective layer 22 in the positive Z-direction, reflect off of reflective polarizer 30 (in the negative Z-direction), reflect off of partially reflective layer 22 (in the positive Z-direction), pass through reflective polarizer 30 (in the positive Z-direction), and pass through linear polarizer 34 (in the positive Z-direction) to reach viewer 46.

Linear polarizer 34 has a pass axis aligned with the pass axis of reflective polarizer 30 (i.e., parallel to the Y-axis) so that any light from the external environment will be polarized by linear polarizer 34 such that light is not reflected by the reflective polarizer 30. Light that is transmitted by the linear polarizer 34 and the reflective polarizer 30 may pass through retarders 28 and 18 and be absorbed by linear polarizer 16.

Including lens element 26-1 (between the partially reflective layer 22 and display system 40) in the optical system of FIG. 2 may advantageously remove the refractive contribution of partially reflective layer 22 and enable a larger field-of-view for a given display system. Additionally, in the optical system of FIG. 2 the functional optical layers (e.g., partially reflective layer 22, retarder 28, reflective polarizer 30, and linear polarizer 34) are embedded within the optical system (e.g., either between lens elements 26-1 and 26-2 or between lens elements 26-2 and 26-3). This may protect the optical layers from damage during operation of device 10.

Each lens element surface has a given radius of curvature. Radius of curvature may be characterized by radius of curvature at the center of the lens element surface, a maximum or minimum radius of curvature, an average radius of curvature, etc. Surface 51 may have a larger radius of curvature (e.g., a larger radius of curvature at the center of the lens element surface, a larger maximum or minimum radius of curvature, and/or a larger average radius of curvature) than surface S2. The surface S3 may have a smaller radius of curvature (e.g., a smaller radius of curvature at the center of the lens element surface, a smaller maximum or minimum radius of curvature, and/or a smaller average radius of curvature) than surface S4. In other words, surface 51 may have less curvature than surface S2 whereas surface S3 may have more curvature than surface S4.

During manufacturing, quarter wave plate 28, reflective polarizer 30, and linear polarizer 34 may all be attached to surface S4 of lens element 26-2 (in that order). Partially reflective layer 22 is coated on surface S3 of lens element 26-2. The lens element 26-3 is subsequently attached to linear polarizer 34 (with attached lens element 26-2).

Alternatively, quarter wave plate 28 and reflective polarizer 30 may be attached to surface S4 of lens element 26-2 (in that order). Partially reflective layer 22 is coated on surface S3 of lens element 26-2. In parallel, linear polarizer 34 may be attached to surface S5 of lens element 26-3. Linear polarizer 34 (with attached lens element 26-3) is then attached to reflective polarizer 30 (with attached lens element 26-2).

Figure 3:
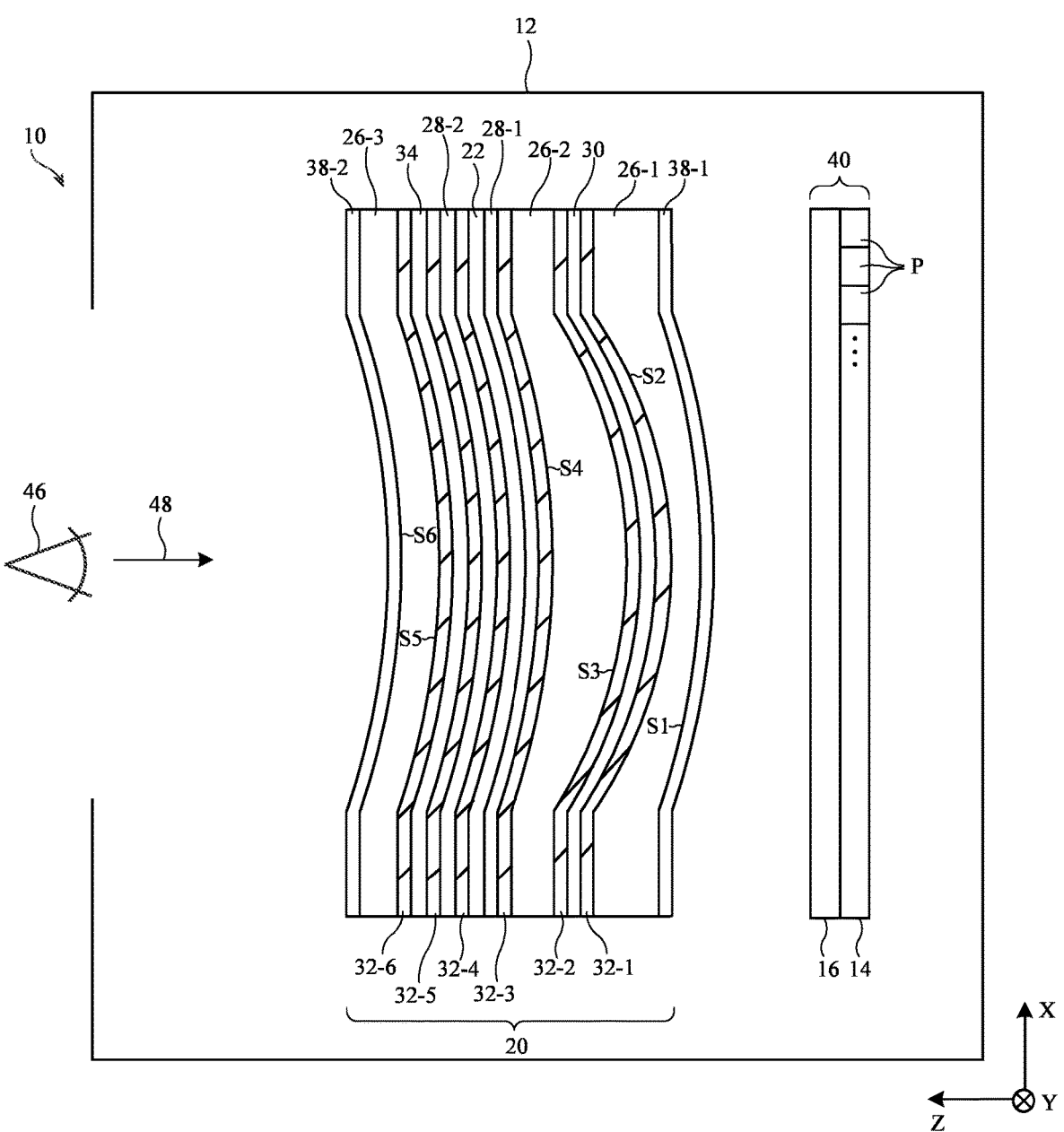
FIG. 3 is a cross-sectional side view of an illustrative electronic device with a lens assembly that includes three lens elements, a partially reflective mirror between the second and third lens elements, and two quarter wave plates between the second and third lens elements in accordance with some embodiments.

In the example of FIG. 2, a retarder is included over linear polarizer 16 in display system 40. This example is merely illustrative. In an alternate arrangement, the retarder may be omitted from display system 40 and an additional retarder may instead be included in optical system 20. The position of reflective polarizer 34 between lens elements 26-2 and 26-3 in FIG. 2 is also merely illustrative. In an alternate arrangement, the reflective polarizer may be instead positioned between lens elements 26-1 and 26-2. FIG. 3 is a cross-sectional side view of device 10 showing these alternate arrangements.

The optical system 20 of FIG. 3 includes several common components as FIG. 2. For simplicity, these common components will not be described again. In FIG. 3, display system 40 includes pixel array 14 and linear polarizer 16 but not a quarter wave plate over the linear polarizer. Optical system 20 in FIG. 3 (as in FIG. 2) includes lens elements 26-1, 26-2, and 26-3.

A coating 38-1 (e.g., an anti-reflective coating) is formed on surface S1 of lens element 26-1. A reflective polarizer 30 is interposed between lens elements 26-1 and 26-2. The pass axis of linear polarizer 16 may be parallel to the pass axis of reflective polarizer 30. A first quarter wave plate 28-1 is attached to surface S4 of lens element 26-2. The fast axis of quarter wave plate 28-1 may be aligned at 45 degrees relative to the pass axis of linear polarizer 16 and reflective polarizer 30. A partially reflective layer 22 is coated on first quarter wave plate 28-1. A second quarter wave plate 28-2 is attached to partially reflective layer 22. A linear polarizer 34 is attached to quarter wave plate 28-2. Quarter waveplate 28-2 is interposed between linear polarizer 34 and partially reflective layer 22. Partially reflective layer 22 is interposed between quarter wave plates 28-1 and 28-2. Quarter wave plate 28-1 is interposed between partially reflective layer 22 and lens element 26-2.

Retarder 28-1 in FIG. 3 may have aspheric curvature (e.g., curvature along multiple axes and with different radii of curvature) with a relatively uniform thickness to provide a relatively uniform retardation. As specific examples, the retardation provided by retarder 28-1 across the entire retarder may be uniform within 20%, within 10%, within 5%, within 3%, within 2%, within 1%, etc. Similarly, the thickness of retarder 28-1 across the entire retarder may be uniform within 20%, within 10%, within 5%, within 3%, within 2%, within 1%, etc. In other words, the retardation variation across the retarder is no more than 20%, no more than 10%, no more than 5%, no more than 3%, no more than 2%, no more than 1%, etc. The thickness variation across the retarder is no more than 20%, no more than 10%, no more than 5%, no more than 3%, no more than 2%, no more than 1%, etc.

Retarder 28-2 in FIG. 3 may have aspheric curvature (e.g., curvature along multiple axes and with different radii of curvature) with a relatively uniform thickness to provide a relatively uniform retardation. As specific examples, the retardation provided by retarder 28-2 across the entire retarder may be uniform within 20%, within 10%, within 5%, within 3%, within 2%, within 1%, etc. Similarly, the thickness of retarder 28-2 across the entire retarder may be uniform within 20%, within 10%, within 5%, within 3%, within 2%, within 1%, etc. In other words, the retardation variation across the retarder is no more than 20%, no more than 10%, no more than 5%, no more than 3%, no more than 2%, no more than 1%, etc. The thickness variation across the retarder is no more than 20%, no more than 10%, no more than 5%, no more than 3%, no more than 2%, no more than 1%, etc.

During operation of device 10 in FIG. 3, light from display system 40 may pass through optical system 20 to be viewed by viewer 46. This light may exit display system 40 in the positive Z-direction (e.g., with a linear polarization), pass through reflective polarizer 30 in the positive Z-direction, reflect off of partially reflective layer 22 (in the negative Z-direction), reflect off of reflective polarizer 30 (in the positive Z-direction), pass through partially reflective layer 22 (in the positive Z-direction), and pass through linear polarizer 34 (in the positive Z-direction) to reach viewer 46.

As shown in FIG. 3, one or more layers of adhesive may be included in optical system 20 to attach adjacent components within the optical system. In the example of FIG. 3, six layers of adhesive (e.g., adhesive layer 32-1, adhesive layer 32-2, adhesive layer 32-3, adhesive layer 32-4, adhesive layer 32-5, and adhesive layer 32-6) are included. Each adhesive layer may be an optically clear adhesive (OCA) layer with a transparency of greater than 80%, greater than 90%, greater than 95%, greater than 99%, etc.

Adhesive layer 32-1 is interposed between reflective polarizer 30 and lens element 26-1. Adhesive layer 32-2 is interposed between lens element 26-2 and reflective polarizer 30. Adhesive layer 32-3 is interposed between quarter wave plate 28-1 and lens element 26-2. Adhesive layer 32-4 is interposed between quarter wave plate 28-2 and partially reflective layer 22. Adhesive layer 32-5 is interposed between linear polarizer 34 and quarter wave plate 28-2. Adhesive layer 32-6 is interposed between lens element 26-3 and linear polarizer 34.

Optical system 20 in FIG. 3 may be formed as a single, solid lens assembly without any intervening air gaps. As shown in FIG. 3, each layer in optical system 20 is attached directly to the adjacent layers. The example of attaching adjacent components in optical system 20 using adhesive layers is merely illustrative. In general, layers in optical system 20 may instead be formed as coatings directly on an adjacent layer (and thus the intervening adhesive layer may be omitted). As a specific example, quarter wave plate 28-1, quarter wave plate 28-2, reflective polarizer 30, and/or linear polarizer 34 may be formed as coatings if desired.

Each lens element surface in FIG. 3 has a given radius of curvature. The surface S1 may have a larger radius of curvature (e.g., a larger radius of curvature at the center of the lens element surface, a larger maximum or minimum radius of curvature, and/or a larger average radius of curvature) than surface S2. The surface S3 may have a smaller radius of curvature (e.g., a smaller radius of curvature at the center of the lens element surface, a smaller maximum or minimum radius of curvature, and/or a smaller average radius of curvature) than surface S4. In other words, surface S1 may have less curvature than surface S2 whereas surface S3 may have more curvature than surface S4.

During manufacturing of the optical system of FIG. 3, quarter wave plate 28-1, partially reflective layer 22, quarter wave plate 28-2, and linear polarizer 34 may all be attached to surface S4 of lens element 26-2 (in that order). Reflective polarizer 30 is attached to surface S3 of lens element 26-2. The lens element 26-3 is subsequently attached to linear polarizer 34 (with attached lens element 26-2).

Alternatively, quarter wave plate 28-1 and partially reflective layer 22 may be attached to surface S4 of lens element 26-2 (in that order). Reflective polarizer 30 is attached to surface S3 of lens element 26-2. In parallel, linear polarizer 34 and quarter wave plate 28-2 may be attached to surface S5 of lens element 26-3 (in that order). Quarter wave plate 28-2 (with attached lens element 26-3) is then attached to partially reflective layer 22 (with attached lens element 26-2).

Figure 4:
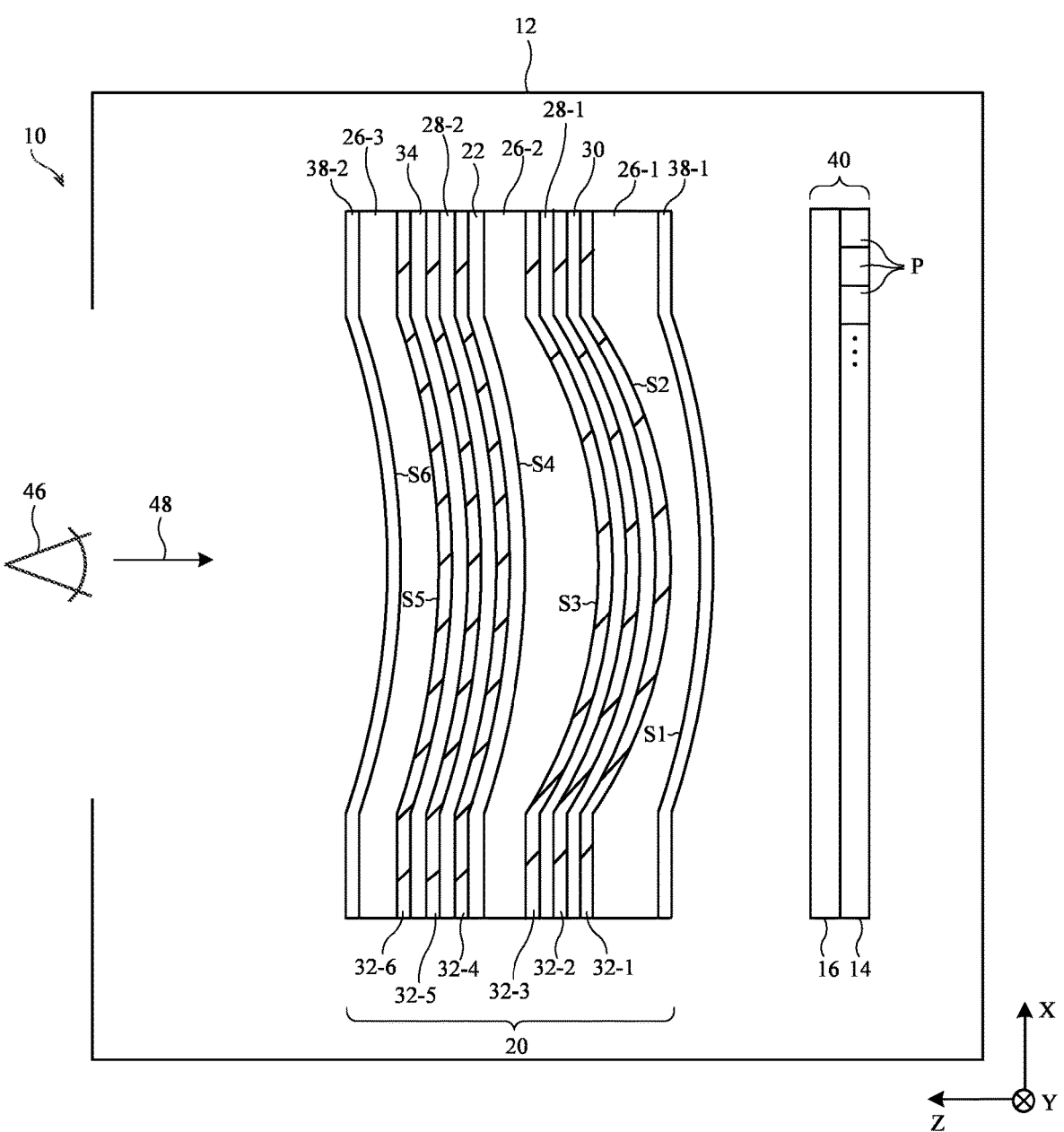
FIG. 4 is a cross-sectional side view of an illustrative electronic device with a lens assembly that includes three lens elements, a partially reflective mirror between the second and third lens elements, and a quarter wave plate between the first and second lens elements in accordance with some embodiments.

In the example of FIG. 3, quarter wave plate 28-1 is formed between lens elements 26-3 and 26-2. Alternatively, as shown in FIG. 4, quarter wave plate 28-1 may instead be formed between lens elements 26-2 and 26-1. In this arrangement, quarter wave plate 28-1 is interposed between lens element 26-2 and reflective polarizer 30. Partially reflective layer 22 is coated on surface S4 of lens element 26-2.

In FIG. 4, adhesive layer 32-1 is interposed between reflective polarizer 30 and lens element 26-1, adhesive layer 32-2 is interposed between quarter wave plate 28-1 and reflective polarizer 30, adhesive layer 32-3 is interposed between lens element 26-2 and quarter wave plate 28-1, adhesive layer 32-4 is interposed between quarter wave plate 28-2 and partially reflective layer 22, adhesive layer 32-5 is interposed between linear polarizer 34 and quarter wave plate 28-2, and adhesive layer 32-6 is interposed between lens element 26-3 and linear polarizer 34.

During manufacturing of the optical system of FIG. 4, partially reflective layer 22, quarter wave plate 28-2, and linear polarizer 34 may all be attached to surface S4 of lens element 26-2 (in that order). Quarter wave plate 28-1 and reflective polarizer 30 may be attached to surface S3 of lens element 26-2 (in that order). The lens element 26-3 is subsequently attached to linear polarizer 34 (with attached lens element 26-2).

Alternatively, partially reflective layer 22 may be attached to surface S4 of lens element 26-2. Quarter wave plate 28-1 and reflective polarizer 30 may be attached to surface S3 of lens element 26-2 (in that order). In parallel, linear polarizer 34 and quarter wave plate 28-2 may be attached to surface S5 of lens element 26-3 (in that order). Quarter wave plate 28-2 (with attached lens element 26-3) is then attached to partially reflective layer 22 (with attached lens element 26-2).

In any of the aforementioned optical systems, a supplemental quarter wave plate may be incorporated between linear polarizer 34 and viewer 46 (e.g., on the non-display side of linear polarizer 34) to suppress reflections within the optical system. One or more removable lenses may also optionally be added to the optical system if desired.

A lens assembly of the type shown in FIGS. 2-4 may be included for each eye of the viewer (e.g., a first lens assembly for the left eye and a second lens assembly for the right eye).

The foregoing is merely illustrative and various modifications can be made to the described embodiments. The foregoing embodiments may be implemented individually or in any combination.

10

What is claimed is:

1. An electronic device, comprising:
a display panel configured to produce light; and
a lens assembly that receives the light, wherein the lens assembly comprises:
a first lens element with a center, wherein the first lens element has a convex surface with a first radius of curvature at the center of the first lens element and a concave surface with a second radius of curvature at the center of the first lens element, wherein the convex surface is interposed between the display panel and the concave surface, and wherein the first radius of curvature is larger than the second radius of curvature;
a second lens element;
a third lens element, wherein the second lens element is interposed between the first and third lens elements;
a partially reflective mirror that is interposed between the first and second lens elements;
a quarter wave plate that is interposed between the second and third lens elements; and
a reflective polarizer that is interposed between the second and third lens elements, wherein the reflective polarizer is interposed between the third lens element and the quarter wave plate.

2. The electronic device defined in claim 1, wherein the lens assembly further comprises:
an anti-reflective coating on the convex surface.

3. The electronic device defined in claim 2, wherein the lens assembly further comprises:
an additional anti-reflective coating on the third lens element.

4. The electronic device defined in claim 1, wherein the lens assembly further comprises:
a linear polarizer that is interposed between the second and third lens elements, wherein the linear polarizer is interposed between the third lens element and the reflective polarizer.

5. The electronic device defined in claim 4, wherein the lens assembly further comprises:
a layer of adhesive between the partially reflective layer and the first lens element.

6. The electronic device defined in claim 4, wherein the lens assembly further comprises:
a layer of adhesive between the quarter wave plate and the second lens element.

7. The electronic device defined in claim 4, wherein the lens assembly further comprises:
a layer of adhesive between the quarter wave plate and the reflective polarizer.

8. The electronic device defined in claim 4, wherein the lens assembly further comprises:
a layer of adhesive between the linear polarizer and the reflective polarizer.

9. The electronic device defined in claim 1, wherein the second lens element has a center and has an additional convex surface with a third radius of curvature at the center of the second lens element and an additional concave surface with a fourth radius of curvature at the center of the second lens element, wherein the additional convex surface is interposed between the display panel and the additional concave surface, and wherein the third radius of curvature is smaller than the fourth radius of curvature.

10. The electronic device defined in claim 1, further comprising:

a linear polarizer that is formed over the display panel; and an additional quarter wave plate that is formed over the linear polarizer.

11. An electronic device, comprising:

a display panel configured to produce light; and a lens assembly that receives the light, wherein the lens assembly comprises:

a first lens element;

a second lens element, wherein the first lens element is interposed between the second lens element and the display panel;

a third lens element, wherein the second lens element is interposed between the first and third lens elements;

a partially reflective mirror that is interposed between the second and third lens elements;

a first quarter wave plate that is interposed between the partially reflective mirror and the third lens element;

a second quarter wave plate that is interposed between the partially reflective mirror and the second lens element;

a linear polarizer that is interposed between the first quarter wave plate and the third lens element; and a reflective polarizer that is interposed between the first and second lens elements.

12. The electronic device defined in claim 11, wherein the second lens element has a convex surface with a first radius of curvature and a concave surface with a second radius of curvature and wherein the first radius of curvature is smaller than the second radius of curvature.

13. The electronic device defined in claim 11, further comprising:

an additional linear polarizer that is formed over the display panel.

14. The electronic device defined in claim 11, wherein the first lens element has a convex surface and a concave surface, wherein the convex surface is interposed between the display panel and the concave surface, and wherein the convex surface has less curvature than the concave surface.

15. An electronic device, comprising:

a display panel configured to produce light; and a lens assembly that receives the light, wherein the lens assembly comprises:

a first lens element;

a second lens element, wherein the first lens element is interposed between the second lens element and the display panel;

a third lens element, wherein the second lens element is interposed between the first and third lens elements;

a partially reflective mirror that is interposed between the second and third lens elements;

a first quarter wave plate that is interposed between the partially reflective mirror and the third lens element;

a reflective polarizer that is interposed between the first and second lens elements;

a second quarter wave plate that is interposed between the reflective polarizer and the second lens element; and a linear polarizer that is interposed between the first quarter wave plate and the third lens element.

16. An electronic device, comprising:

a display panel configured to produce light; and a lens assembly that receives the light, wherein the lens assembly comprises:

a first lens element, wherein the first lens element has a first convex surface and a first concave surface, wherein the first convex surface is interposed between the display panel and the first concave surface, and wherein the first convex surface has less curvature than the first concave surface;

a second lens element, wherein the second lens element has a second convex surface and a second concave surface, wherein the second convex surface is interposed between the display panel and the second concave surface, wherein the second convex surface has more curvature than the second concave surface, and wherein the first lens element is interposed between the second lens element and the display panel;

a third lens element, wherein the third lens element has a third convex surface and a third concave surface, wherein the third convex surface is interposed between the display panel and the third concave surface, and wherein the second lens element is interposed between the first and third lens elements;

a first anti-reflective coating on the first convex surface;

a second anti-reflective coating on the third concave surface;

a partially reflective mirror that is interposed between the first and second lens elements;

a quarter wave plate that is interposed between the second and third lens elements; and a reflective polarizer that is interposed between the second and third lens elements, wherein the reflective polarizer is interposed between the third lens element and the quarter wave plate.

17. The electronic device defined in claim 16, wherein the first convex surface has a first radius of curvature, wherein the first concave surface has a second radius of curvature, wherein the second convex surface has a third radius of curvature, wherein the second concave surface has a fourth radius of curvature, wherein the first radius of curvature is greater than the second radius of curvature, and wherein the third radius of curvature is less than the fourth radius of curvature.

18. A lens assembly, comprising:

a first lens element, wherein the first lens element has a convex surface with first varying radi of curvature comprising a first minimum radius of curvature and a concave surface with second varying radii of curvature comprising a second minimum radius of curvature and wherein the first minimum radius of curvature is larger than the second minimum radius of curvature;

a second lens element;

a third lens element, wherein the second lens element is interposed between the first and third lens elements;

a partially reflective mirror that is interposed between the first and second lens elements;

a quarter wave plate that is interposed between the second and third lens elements; and a reflective polarizer that is interposed between the second and third lens elements, wherein the reflective polarizer is interposed between the third lens element and the quarter wave plate.

* * * * *